United States Patent [19]

Althaus

[11] 4,067,011
[45] Jan. 3, 1978

[54] DIGITAL TRANSPONDER UNIVERSAL PULSE ASSEMBLY

[75] Inventor: Raymond L. Althaus, Mesa, Ariz.

[73] Assignee: Motorola, Inc., Schaumburg, Ill.

[21] Appl. No.: 734,786

[22] Filed: Oct. 22, 1976

[51] Int. Cl.² .............................................. G01S 9/56
[52] U.S. Cl. ............................................. 343/6.8 LC
[58] Field of Search ..................... 343/6.8 R, 6.8 LC

[56] References Cited

U.S. PATENT DOCUMENTS

| | | | |
|---|---|---|---|
| 3,512,154 | 5/1970 | Farrar ............................ | 343/6.8 LC |
| 3,754,251 | 8/1973 | Thornberg et al. ............ | 343/6.8 LC |
| 3,949,397 | 4/1976 | Wagner et al. ................ | 343/6.8 R X |

*Primary Examiner*—T.H. Tubbesing
*Attorney, Agent, or Firm*—M. David Shapiro

[57] ABSTRACT

A combination of large scale integrated digital circuits for providing universally selectable decoding, encoding and over-interrogation control functions in a radar transponder. The circuits are implemented in semiconductor chip and hybrid circuit form and selection of desired functions may be accomplished by external switches, by jumper wiring or by custom designed printed circuit boards.

The use of large scale integrated circuit techniques allows facilitation of multiple control functions without necessity of bulky assemblies or high power consumption.

6 Claims, 6 Drawing Figures

FIG. I

DIGITAL TRANSPONDER UNIVERSAL PULSE ASSEMBLY

FIELD OF THE INVENTION

The invention relates to a universal digital pulse assembly for a radar transponder.

BACKGROUND OF THE INVENTION

There are three control functions each of which may or may not be required in a particular radar transponder application.

First, a transponder may or may not be required to respond to only one of a plurality of time coded input pulses. Second, a transponder may or may not be required to respond by transmitting one of a plurality of time coded pulse signal combinations, and third, there probably will be a requirement for a transponder to be limited in its response to radar interrogation to prevent self destruction due to operation of the transponder transmitter at excessive duty cycle rates.

In the past, one or more of the aforementioned three functions have been supplied in a given transponder as a result of the requirements for a specific transponder application. Thus, each transponder was "tailored", or custom designed, for the intended application. High cost and the sheer bulk and high power requirements of circuits able to perform all of the possible combinations of the three functions have prevented manufacturers from marketing a universal system; that is, a system able to provide any possible combination of all three functions.

Prior art equipment providing any of the decode, encode or over-interrogation control functions used analog circuit techniques that required resistors or capacitors, selected or adjusted during assembly or test. Code space timing signals have been generated by monostable multivibrators utilizing resistor-capacitor timing circuits, passive delay lines or oscillators (utilizing inductor-capacitor timing) synchronized to the incoming video interrogating pulses. Over-interrogation detectors used in prior art control functions have been of the resistor capacitor integrator type. Each transponder transmission placed a fixed electrical charge on a capacitor. The capacitor discharge rate was controlled by the discharge resistance value to determine the over-interrogation threshold rate. Detection depends upon sensing a predetermined threshold voltage level on the capacitor.

Since the present practice of custom design for each application prevents manufacturers from producing a sizable backlog of inventory, there is, typically, a relatively long delay from the time specifications are determined until units may be delivered to meet these specifications for a particular application. The manufacturer is also limited in a given production run to transponder units meeting specific requirements. This limits the production quantity which has the secondary effect of increasing costs.

SUMMARY OF THE INVENTION

The foregoing and other shortcomings and problems of the prior art are overcome, in accordance with the present invention, by utilizing one or a plurality of large scale integrated digital circuit semiconductor chips or digital hybrid circuits to accomplish the decoding, encoding and over-interrogation control functions which may be required in a radar transponder. A common clock circuit, synchronized to the interrogating pulse signal, is utilized throughout the system of the invention. Selection of specific functions are accomplished by the setting of switches, jumper wires or by custom design of a printed wiring board upon which the universal circuits are mounted and by which the circuits are interconnected one to the other and to the receiver and transmitter portions of the transponder.

According to one aspect of the present invention, decoding, encoding and over-interrogation control functions are provided by means of digital circuits capable of universal provision of any combination of a large plurality of possible combinations of these functions.

According to another aspect of the present invention, decoding, encoding and over-interrogation control functions are digitally generated by one or a plurality of semiconductor chips or hybrid circuits.

According to still another aspect of the present invention, a common stock circuit is used for decoding, encoding and over-interrogation circuit control functions.

According to yet another aspect of the present invention, specific selection of decoding, encoding and over-interrogation control functions are provided by switches, jumper wires or by printed wiring patterns on a printed wiring board.

The foregoing and other aspects of the invention will be more readily understood from the following detailed description of an illustrative embodiment of the invention in conjunction with the drawings in which.

DETAILED DESCRIPTION

Figure 1:
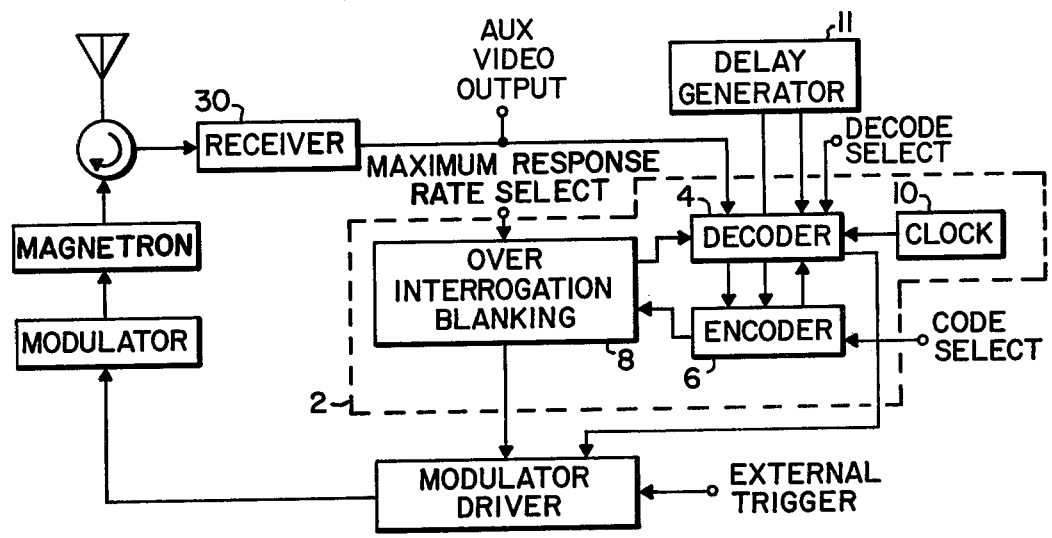
FIG. 1 is a block diagram of a universal transponder providing a plurality of encode, decode and over-interrogation functions.

Referring first to FIG. 1, a typical transponder is shown incorporating the preferred embodiment of the invention, universal digital pulse assembly 2. Universal digital pulse assembly 2 further comprises decoder circuit 4, encoder circuit 6 and over-interrogation blanking circuit 8. Clock 10 may be a separate circuit, as shown, or may be incorporated as part of any of the other circuits 4, 6 or 8. Circuits 4, 6 and 8 are preferably embodied as integrated circuits in the well known CMOS semiconductor chip construction. In the particular embodiment illustrated here, decoder 4 is of hybrid fabrication. However, it will be obvious to one skilled in the art that any two or even all three of circuits 4, 6 and 8 may be combined on a single CMOS semiconductor chip.

Each of circuits 4, 6 and 8 has an associated selecting means. The selecting means associated with decoder 4 is represented in FIG. 1 by the single input control labeled "Decode Select". The selecting means associated encoder 6 is represented by the single control labeled "Code Select". The selecting means associated with over-interrogation blanking circuit 8 is represented by the single control labeled "Maximum Response Rate Select".

Figure 2:
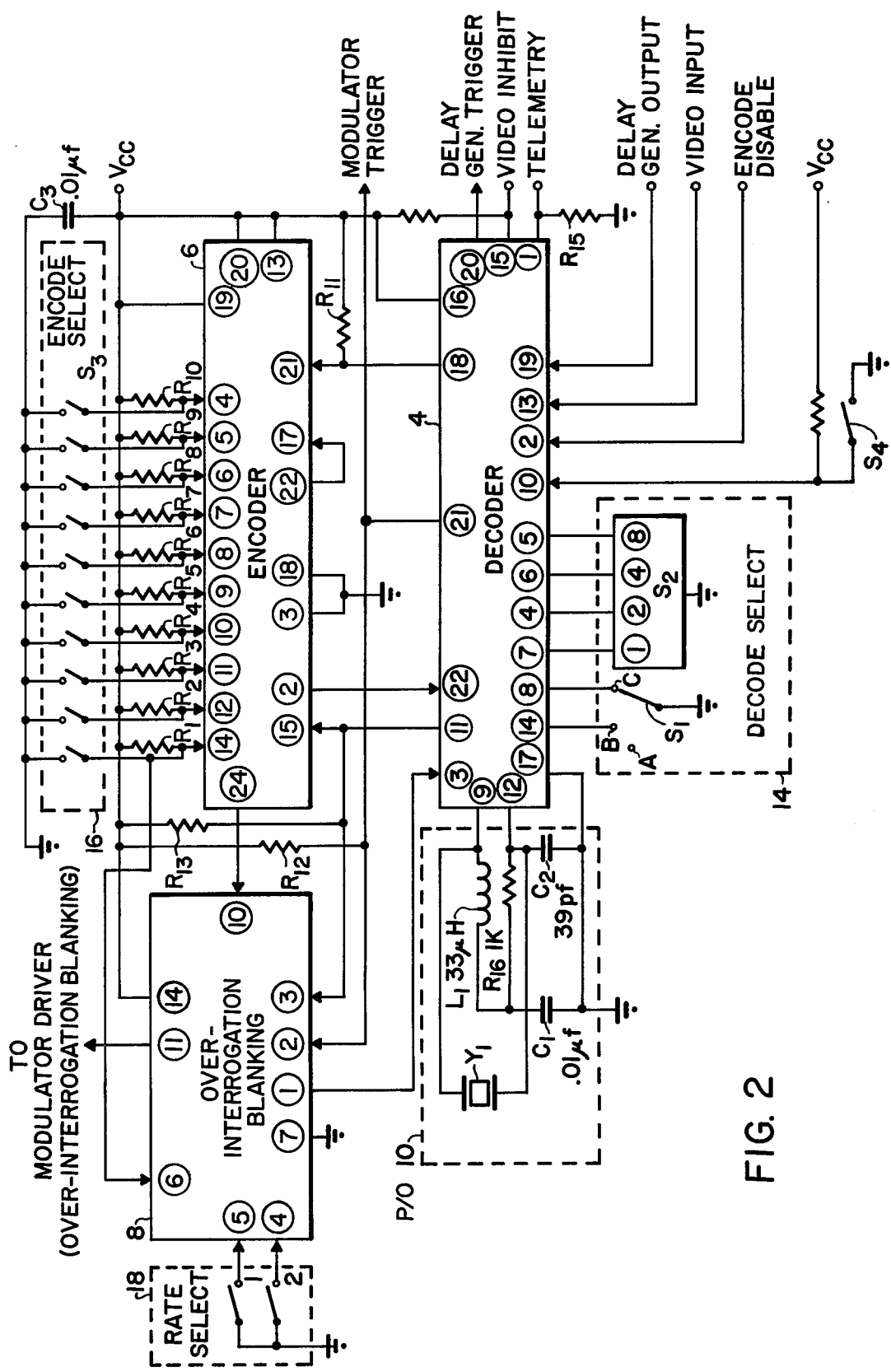
FIG. 2 is a more detailed block diagram of the universal digital pulse assembly (dashed line portion) of FIG. 1.
Figure 3:
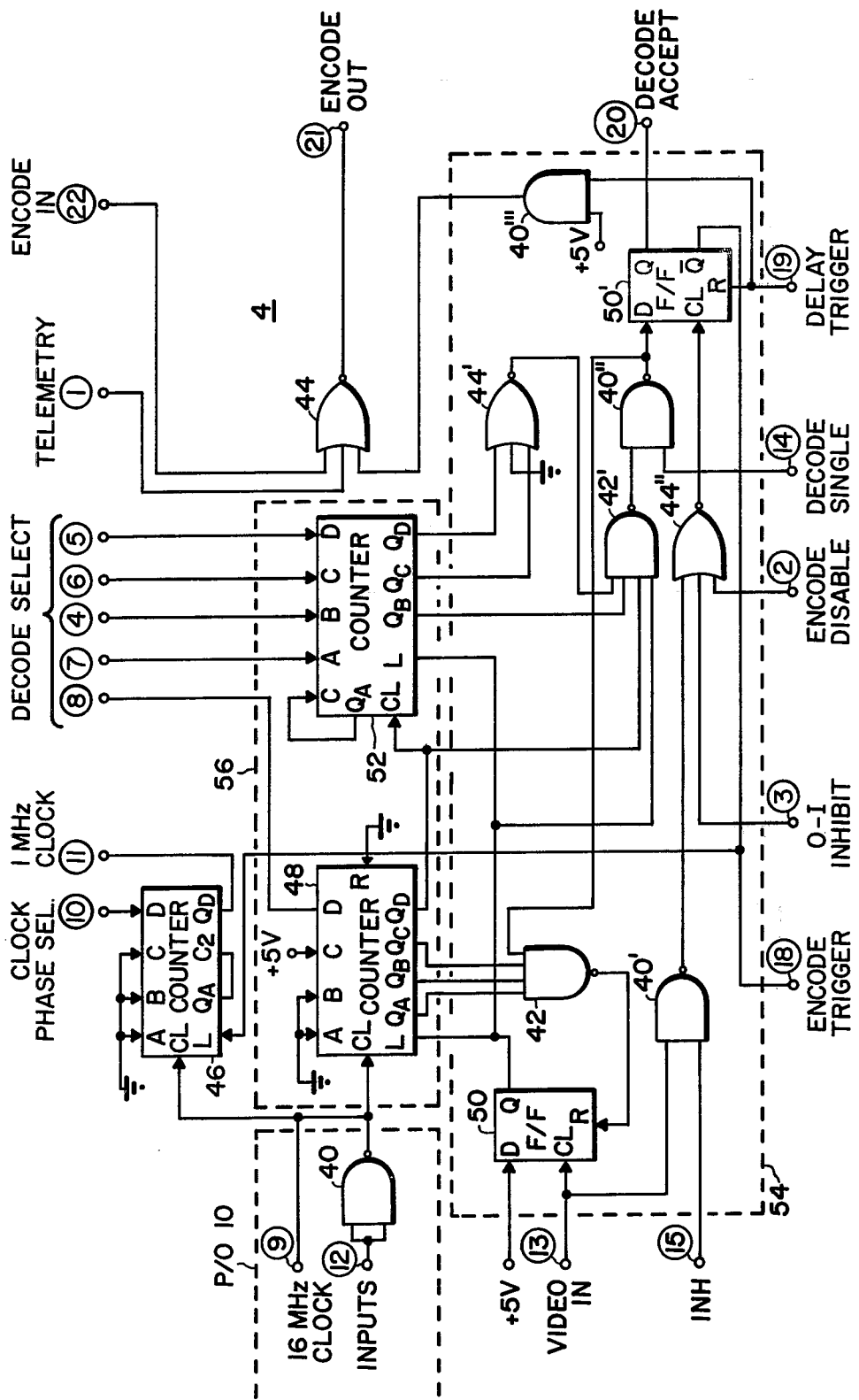
FIG. 3 is a detailed logic diagram of the decoder portion of FIGS. 1 and 2.

FIG. 2 illustrates universal digital pulse assembly 2 in more detail than does the dashed portion of FIG. 1. FIGS. 3, 4 and 5 define, in still more detail, embodiments of decoder 4, encoder 6 and over-interrogation control circuit 8, respectively. It should be noted that the pin numbers in FIGS. 2, 3, 4 and 5 are encircled to avoid confusion with reference numerals which also appear in these drawings.

Referring to FIG. 2, it may be seen that, in the embodiment there illustrated, part of crystal oscillator circuit 10 is external of and connected to decoder 4. It will be clear to one skilled in the art that while decoder 4 is used to supply active element 40 (as will be described in FIG. 3, below) for clock circuit 10, the element may be located in either encoder 6 or over-interrogation circuit 8. And, as before mentioned, the particular distribution of digital logic elements in the illustrated embodiment are not limiting. It is clear that the elements could be located on a single semiconductor chip or on any number of chips. FIG. 2 serves to illustrate the specific interconnections between decoder 4, encoder 6 and over-interrogation circuit 8 in the illustrated embodiment of the invention. Switches $S_1$ and $S_2$, a ten position switch with BCD output leads, comprise decode selecting means 14 for selection of a particular incoming signal code by decoder 4. $S_3$, a bank of ten single-pole-single throw switches, comprise encode selecting means 16 for selection of the transponder transmitter output signal code in encoder 6. Of course, the switches of selecting means 14 and/or 16 may alternately be accomplished with wired connections for semi-permanent or permanent selection of decoding and/or encoding functions in an alternate embodiment of the invention (not shown). The wired connections may be either in the form of jumper wires or in the form of a custom designed printed wiring board or in the form of a combination of both. And, of course, any combination of switches, jumper wires and printed wiring board design may be used to accomplish the desired selection function combinations for a given transponder application.

Similarly, the selection function, rate select circuit 18, for over-interrogation circuit 8, may be accomplished with switches, jumper wires or with a custom printed circuit wiring board, as described above for decode select function 14 and encode select function 16.

In FIGS. 2 and 3 it may be seen that part of oscillator circuit 10 is connected to decoder 4 by means of pins 9 and 12 on decoder 4. (Refer now to FIG. 3). Pins 9 and 12 are connected within decoder 4 to NAND gate 40 which provides the necessary active elements for oscillation at 16Mhz. TTL NAND gates 40, 40' 40", 40"' may be a single semiconductor chip as supplied, for example, by Texas Instruments, Inc., Dallas, Tex., and identified by their part number 74LS00. Counter 46 is utilized to reduce the 16 Mhz oscillator frequency to 1Mhz, a required system clock frequency, which is available on pin 11 of decode circuit 4. Counters 46 and 52 may be part number 74LS197 semiconductor chips as supplied by Texas Instruments, Inc., Dallas, Tex. The 1Mhz output of counter 46 on pin 11 is synchronized to the video input signal on pin 13 of decode circuit 4 by means of digital circuits comprising gate 40', gate 44" and flip-flop 50' part of logic control 54.

Referring to the decoder illustrated in FIG. 3, it will be seen that the output of 16 megahertz oscillator 10 is fed to clock input CL of counter 46. Counter 46 is a two stage ripple counter available from Texas Instruments, Inc., Dallas, Tex. and may be identified by their part number 74LS197. Counter 46 is connected to divide input CL, the 16 megahertz timing signal from oscillator 10 by 16. The output of counter 46 is available at output $Q_d$. The output is a one megahertz clock signal and is distributed to the rest of universal control system 2 by means of pin 11 on decoder 4.

The 16 megahertz output signal from oscillator 10 is also fed to clock input CL of counter 48, part of decoder time control 56. Decoder time control 56 comprises counters 48 and 52. Decode select 14 (see FIG. 2) comprises switches S1 and S2. These switches are connected to decoder 4 by means of pins 4, 5, 6, 7 and 8, see FIG. 3. Switches S1 and S2 of decode select 14 are used to set the initial count condition of counters 48 and 52. Decode logic control 54 comprises flip-flops 50, and 50', NAND gates 40', 40", 40"', NOR gates 44', 44", and NAND gates 42, 42'. A plurality of external inputs to digital control circuit 54 are provided. An inhibit decoder signal may be applied at pin 15. An over-interrogation inhibit signal from over-interrogation circuit 8 (see FIG. 2) may be applied at pin 3. An encode disable signal may be applied at input pin 2 to prevent multiple interrogation triggering. Pin 14 of decoder 4 is provided to allow decoder circuit 4 to respond to a single pulse interrogation transmitter. Pin 14 is set by means of position A of switch S1, part of decoder select 14 (FIG. 2). Delay generator 11 (see FIG. 1) output is connected to pin 19, the delay trigger input to decoder 4. Delay generator 11 is triggered by the decode accept output, pin 20, of logic control circuit 54.

The video input signal at pin 13 of decoder 4 is provided from receiver 30 (see FIG. 1). Logic control circuit 54 enables counter 46 to be synchronized to the video input at pin 13 by means of a connection from output $\overline{Q}$ of flip-flop 50' to input L of counter 46.

NOR gate 44 provides an encode output signal on pin 21 of decoder 4. The encode output on pin 21 of decoder 4 may be enabled by a signal from one of three places. First, NAND gate 40"' may supply the necessary input signal to NOR gate 44. A second input to NOR gate 44 may be supplied from a telemetry signal on pin 1 of decoder 4. And third, an encode input on pin 22 of decoder 4 will also supply an output from NOR gate 44.

Figure 4A:
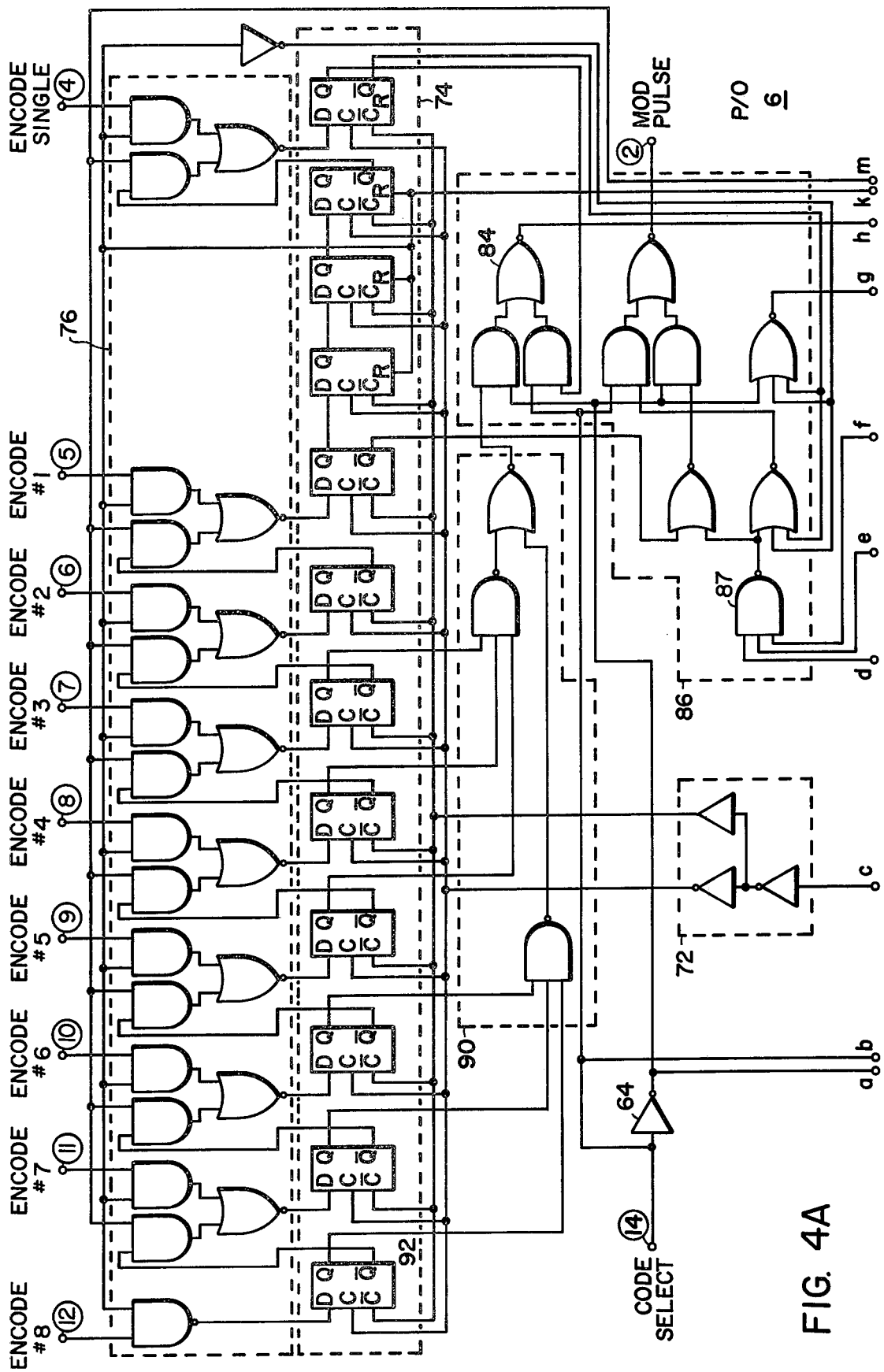
FIG. 4 is a detailed logic diagram of the encoder portion of FIGS. 1 and 2, it comprises FIGS. 4A and 4B.
Figure 4B:
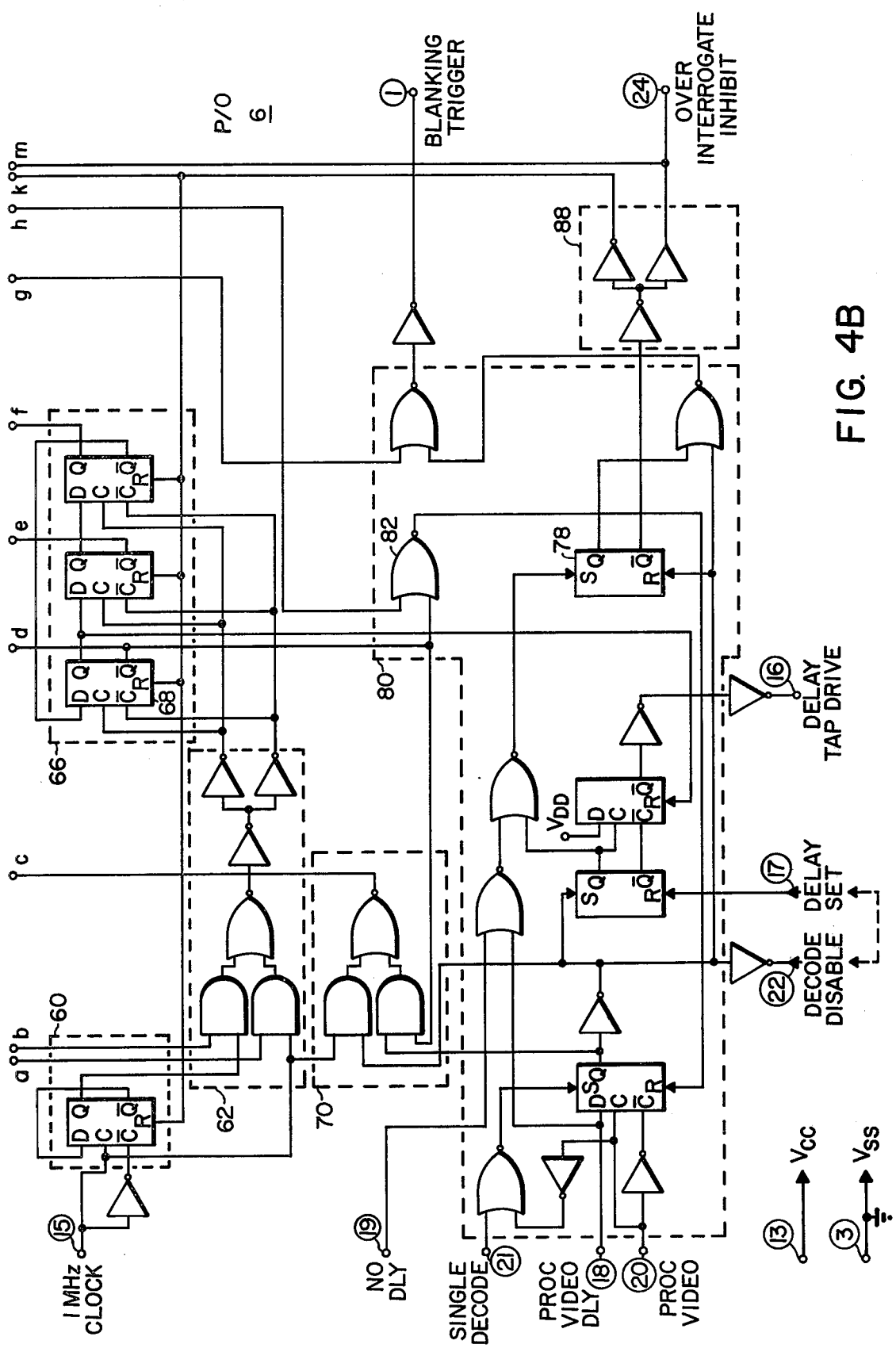
Figure 5:
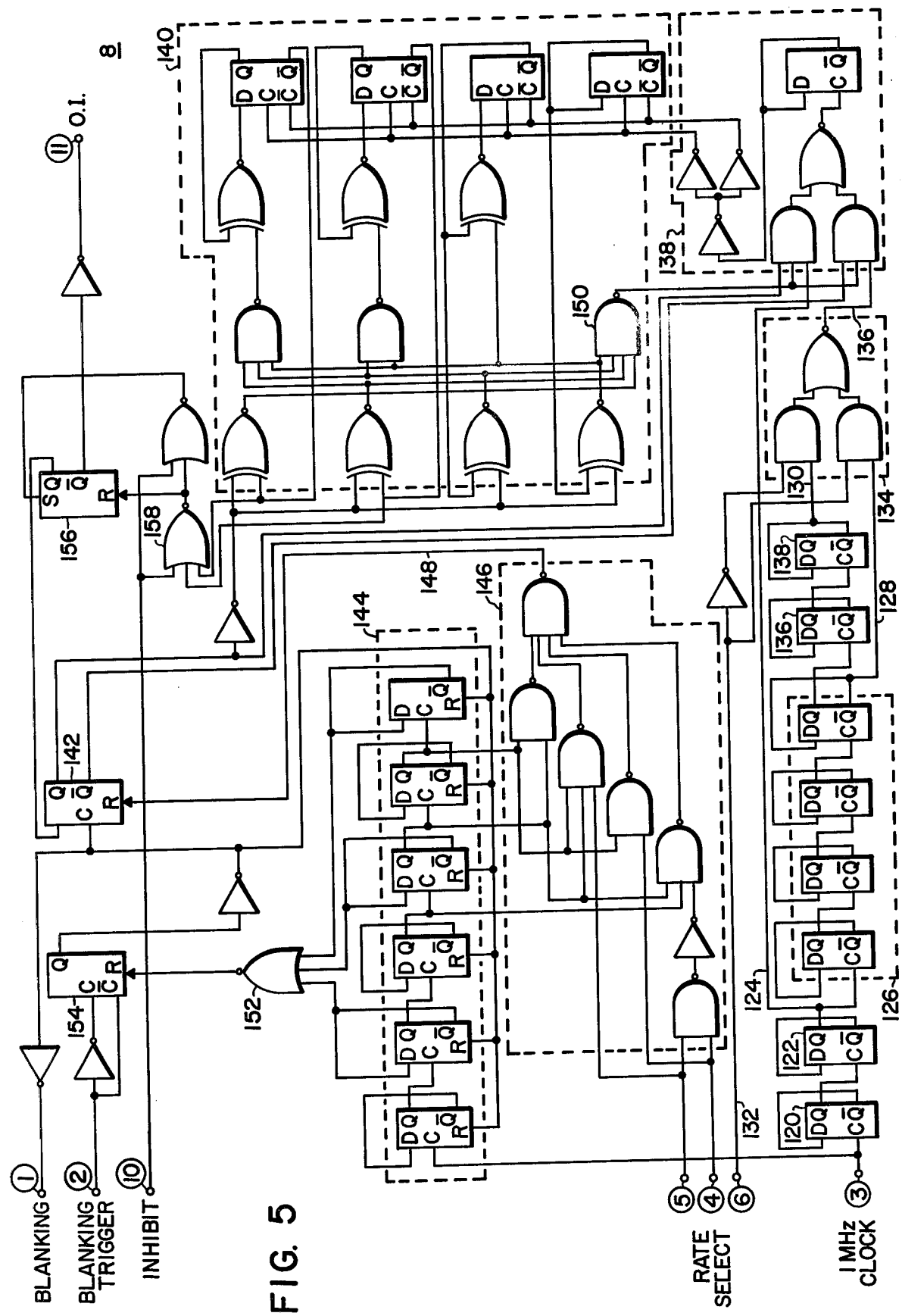
FIG. 5 is a detailed logic diagram of the over-interrogation control circuits of FIGS. 1 and 2.

The reader should now refer to FIGS. 4A and 4B together. (It should be noted that the lower case letter designations along the right side of FIG. 4A correspond to like lower case letter designations along the left side of FIG. 4B. It should be understood that like designators indicate connections between these two drawings.) The 1 megahertz clock signal applied to pin 15 of encoder 6 is applied to divide by 2 circuit 60. The output of divide by 2 circuit 60 and the 1 megahertz clock are both applied to code select control circuit 62. One of switches S3 and encode select circuit 16 (see FIG. 2) is connected to pin 14 of encoder 6. This signal level is complimented by inverter 64 and applied to code select control circuit 62. Code select circuit 62 therefore, selects either the 1 megahertz clock or the 1 megahertz clock divided by 2 (500 kilohertz) as a clock source for shift register counter 66. Shift register counter 66 is arranged to provide a divide by 6 function. If a 500 kilohertz clock is applied to shift register counter 66, it provides a clock pulse at output $\overline{Q}$ of flip-flop 68 at a 12 microsecond repetition rate. If the 1 megahertz clock is applied to shift register counter 66 the output therefrom will be at a 6 microsecond repetition rate. The output of shift register counter 66 is taken from output $\overline{Q}$ of flip-flop 68 and applied through clock logic circuit 70 to clock driver circuits 72. Clock driver 72 feeds shift register 74. Shift register 74 is a 12 bit shift register. Register control 76 is utilized to control both the initial loading state for register 74 and the subsequent shifting thereof. Register control circuit 76 has a plurality of inputs including inputs from switches S3 on pins 4, 5, 6, 7, 8, 9, 10, 11 and 12. (See FIG. 2 for details of Switch S3.) The system reset is derived from output $\overline{Q}$ of flip-flop 78, part of logic control circuit 80. NOR gate 82, part of logic control circuit 80 is used to reset logic control circuit 80 on one of two inputs; a low output on $\overline{Q}$ output of flip-flop 68, part of shift register counter 66, and a low output from NOR gate 84, part of modulator pulse logic 86, provides a high reset signal on the output line from NOR gate 82. Upon initiation, shift register counter 66 is set to "000" by the reset signal from output $\overline{Q}$ of flip-flop 78 through driver circuits 88. Shift register counter 66 is generally known in the art as a Johnson counter. Upon successive clock inputs, shift register counter 66 will take the following states;

000
100
110
111
011
001
000

It may be seen, then, that the cycle of shift register counter 66 repeats for each 6 input clock pulses. Modulator logic circuit 86 is enabled at this time since the "001" state of shift register counter 66 actuates input NAND gate 87. This state will be reached once every 12 microseconds if divide by 2 circuit 60 is used and every 6 microseconds if circuit 60 is not used. The determination as to whether the repetition rate is 6 or 12 microseconds is made by the position of the switch connected to pin 14 on encoder 6. It should be noted that encoder 6 is synchronized by a reset pulse throughout the circuit when pin 21 of encoder 6 is in a high condition. In the illustrated embodiment of the invention, pin 21 is driven from pin 18 of decoder 4 (see FIG. 3). Pin 18 provides the complement of the decode accept signal which appears on pin 20 of decoder 4 (FIG. 3).

The gates in "all ones" selector circuit 90 are arranged to sense the presence of one state levels in the first 6 flip-flops of shift register 74. When the input to pin 12 of encoder 6 is low, input D of flip-flop 92, part of shift register 74, is always high. Under these conditions input D of flip-flop 92 provides a 1 input at all times to shift register 74. When these ones have propagated down the first 6 flip-flops of shift register 74, all 1's sensor circuit 90 senses this fact and puts a high level signal into modulator pulse logic circuit 86. This in turn provides a reset signal to NOR gate 82 and logic control circuit 80.

The reader's attention is now directed to FIG. 5. Circuit 8 of FIG. 5 represents a preferred embodiment of an over-interrogation circuit for the invention. The 1 megahertz clock signal from decoder 4 (see FIG. 2) drives over-interrogation circuit 8 at pin 3. Flip-flops 120 and 122 serve to divide the input clock signal by factor of 4. It will be clear that a 250 kilohertz signal will be present on line 124. Four flip-flops comprise divide by 16 circuit 126. Since the input to divide by 16 circuit 126 is a 250 kilohertz signal from flip-flop 122, the output of divide by 16 circuit 126 is a clock signal having a frequency of 15,625 hertz which is present on line 128. This signal is fed to flip-flops 136 and 138 thereby dividing it by 4. The output of flip-flop 138 is available on line 130. This signal has a frequency of 3906.25 hertz. The 15,625 hertz signal on line 128 and the 3906.25 hertz signal on line 130 are fed to clock logic circuit 134. Clock logic circuit 134 determines which of the clock signals is to be used in the balance of the system. Control of the clock frequency is accomplished by the logic level on line 132. If line 132 is at a high level, the 15,625 hertz signal on line 128 is transmitted through clock logic circuit 134 to line 136. If the logic level on 132 is at a low level, the 3906.25 hertz signal on line 130 is transmitted through clock logic circuit 134 to line 136. The logic level on line 132 is determined by the input to pin 6 of over-interrogation circuit 8. The selected signal is fed to up-down counter clock select logic circuit 138. Up-down counter clock control logic circuit 138 feeds up-down counter 140. The 250 kilohertz signal on 124 is also fed to up-down counter clock logic selector circuit 138. When up-down clock 140 is counting "up", logic circuit 138 selects the 250 kilohertz clock and when up-down counter 140 is counting "down", either the 15,625 hertz or the 3906.25 hertz clock signal is applied. Flip-flop 142 controls counter 140 to count in either the "up" or the "down" mode. Counter circuit 144, comprising 6 ripple connected flip-flops, is driven from the 1 megahertz clock at pin 3 of over-interrogation circuit 8. Rate select logic circuit 146 determines a reset time for flip-flop 142, up-down count control. Reset signal R for flip-flop 142 appears on line 148 from logic circuit 146. If logic levels on pins 4 and 5 of over-interrogation circuit 8 are both high, counter 144 will provide an output reset signal on line 148 of logic circuit 146 at the end of the 12th count. If the logic level on pin 4 is high and the logic level on pin 5 is low counter 144 will provide an output pulse on signal line 148 at the end of 16 counts. If the logic level on pin 5 is high and on pin 4 is low, counter 144 will provide an output pulse on line 148 at the end of 20 counts. If the logic levels on pins 4 and 5 of over-interrogation circuit 8 are both low, counter 144 will provide an output signal on line 148 each 24 counts. Flip-flop 142 is, therefore, reset at either 12, 16, 20 or 24 counts depending on the logic levels on pins 4 and 5 of over-interrogation circuit 8. The forty-second count of shift register 144 is sensed by NOR gate 152. NOR gate 152, in response, resets flip-flop 154 42 microseconds after shift register 144 starts counting, Flip-flop 142, (the flip-flop that controls the up-down counter) is reset at a shorter interval however. It must be remembered that the reset cycle of flip-flop 142 is controlled by the positions of the rate select switches connect to pins 4 and 5 of over-interrogation circuit 8. The negative signal on pin 2 of over-interrogation circuit 8 causes a high output, Q, of flip-flop 154. This releases the reset on shift register counter 144 and allows it to begin to count. Shift register counter 144 will count to a total count of 42 determined by NOR gate 152. At a count of 42, NOR gate 152 output goes high resetting flip-flop 154 and causing the Q output of flip-flop 154 to go low. This resets shift register counter 144 to the all "zero" state. Flip-flop 142 is reset by logic circuit 146 at either 12, 16, 20 or 24 microseconds into the count of shift register counter 144. A high output on line 148 resets flip-flop 142 to the "zero" state. Flip-flop 142 then has a Q output of "zero". This "zero" output is applied to clock logic circuit 138 causing a 250 kilohertz clock signal to be delivered therefrom. It also causes up-down counter 140 to count "up". Flip-flop 142 will be in the "zero" state after reset is applied on line 148 until it receives a clock input. The clock input for flip-flop 142 comprises a transition from a low to a high level on clock input C. This input is accomplished when 154 is reset by NOR gate 152 at count 42 of shift register counter 144. When flip-flop 142 is set to the "one" state, clock logic 138 supplies one of two lower frequency clock signals to up-down counter 140. Up-down counter 140 then counts in the "down" direction. NAND gate 150 is used to assure that up-down counter 140 does not count below "zero" when it is "down" counting nor above a maximum count of 15 when "up" counting. The over-interrogation output inhibit signal on pin 11 of over-interrogation circuit 8 goes low. This corresponds to a $\overline{Q}$ output from flip-flop 156 which is at a high level. $\overline{Q}$ of flip-flop 156 will go high when flip-flop 156 is reset on the R input. The required high level R input is provided when all 3 inputs to NOR gate 158 are low. The reset is inhibited by a high level input on pin 10 of over-interrogation circuit 8, or on any of the other inputs to NOR gate 158.

It will be clear to one skilled in the art that various other modifications and changes may be made to the present invention from the principles of the invention described above without departing from the spirit and scope thereof, as encompassed in the accompanying claims.

What is claimed is:

1. A universal pulse assembly apparatus for a transponder the transponder having a receiver and a transmitter, the apparatus in combination comprising:
   means for decoding a coded video pulse signal from the receiver, said decoding means having first selecting means for determining one of a plurality of predetermined video pulse codes;
   means for encoding a modulating pulse signal for the transmitter, said encoding means having second selecting means for determining one of a plurality of predetermined transmitter pulse codes; and
   means for controlling the pulse response rate of the transponder; said controlling means having third selecting means for determining one of a plurality of maximum allowable transponder response rates, said controlling means operable to limit modulation of the transponder when said response rate of the transponder exceeds said selectable maximum response rate.

2. A universal digital pulse assembly apparatus for a transponder the transponder having receiver and a transmitter, the apparatus in combination comprising:
   means for digitally decoding a coded video pulse signal from the receiver, said digital decoding means having first selecting means for determining one of a plurality of predetermined video pulse codes;
   means for digitally encoding a modulating pulse signal for the transmitter, said digital encoding means having second selecting means for determining one of a plurality of predetermined transmitter pulse codes; and
   means for digitally controlling the pulse response rate of the transponder; said controlling means having third selecting means for determining one of a plurality of maximum allowable transponder response rates, said controlling means operable to limit modulation of the transponder when said response rate of the transponder exceeds said selectable maximum response rate.

3. The apparatus according to claim 2 wherein at least one of said digital decoding means, said digital encoding means and said digital control means is embodied on a large scale CMOS circuit chip.

4. The apparatus according to claim 2 wherein at least one of said first, second and third selecting means comprises switches for determining which of said predetermined functions is selected.

5. The apparatus according to claim 2 wherein at least one of said first, second and third selecting means comprises jumper wires for determining which of said predetermined functions is selected.

6. The apparatus according to claim 2 wherein at least one of said first, second and third selecting means comprises a wiring pattern on a printed circuit board, for determining which of said predetermined functions is selected, said printed circuit board being utilized to mount the combination comprising said digital decoder means, said digital encoder means and said digital controlling means.

* * * * *